United States Patent
Ghare et al.

(10) Patent No.: US 10,560,465 B2
(45) Date of Patent: *Feb. 11, 2020

(54) REAL TIME ANOMALY DETECTION FOR DATA STREAMS

(71) Applicant: Amazon Technologies, Inc., Seattle, WA (US)

(72) Inventors: Gaurav D. Ghare, Seattle, WA (US); Roger Shane Barga, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,314

(22) Filed: Nov. 9, 2018

(65) Prior Publication Data

US 2019/0081876 A1 Mar. 14, 2019

Related U.S. Application Data

(63) Continuation of application No. 15/084,343, filed on Mar. 29, 2016, now Pat. No. 10,129,118.

(51) Int. Cl.
*H04L 29/06* (2006.01)

(52) U.S. Cl.
CPC ...... *H04L 63/1408* (2013.01); *H04L 63/1425* (2013.01)

(58) Field of Classification Search
CPC ................. H04L 63/1425; H04L 63/1408
See application file for complete search history.

(56) References Cited

U.S. PATENT DOCUMENTS

| 8,713,190 | B1* | 4/2014 | Goodall | H04L 41/0631 709/231 |
|---|---|---|---|---|
| 9,479,581 | B2* | 10/2016 | Kimchi | H04L 67/1046 |
| 9,509,710 | B1* | 11/2016 | Barry | H04L 63/1425 |
| 9,613,123 | B2* | 4/2017 | Gupta | G06F 16/283 |
| 9,858,124 | B1* | 1/2018 | Ghare | G06F 9/5083 |
| 2005/0193281 | A1* | 9/2005 | Ide | G06F 11/0709 714/4.1 |
| 2006/0053123 | A1* | 3/2006 | Ide | G06F 16/35 |

(Continued)

OTHER PUBLICATIONS

Matthias Reif, et al., "Anomaly Detection by Combining Decision Trees and Parametric Densities", 19th International Conference on Pattern Recognition, 2008: ICPR 2008; Dec. 8-11, 2008, pp. 1-4.

(Continued)

*Primary Examiner* — Lashonda T Jacobs
(74) *Attorney, Agent, or Firm* — Robert C. Kowert; Kowert, Hood, Munyon, Rankin & Goetzel, P.C.

(57) ABSTRACT

Real time detection of anomalies may be implemented for a data stream. A data stream may receive data records as input. An evaluation of the data records may be performed as the data records are received utilizing an anomaly detection model that is dynamically generated for a time period that includes the data records. A responsive action may be performed in response to detecting various anomalies, such as providing a notification of the anomaly, requesting a corrective action, invoking further analysis of the detected anomaly. Evaluations of the data record and responsive actions may be performed as specified by a user, in some embodiments.

20 Claims, 8 Drawing Sheets

(56) References Cited

U.S. PATENT DOCUMENTS

| | | | |
|---|---|---|---|
| 2007/0260581 A1* | 11/2007 | Hiller | H04L 12/1868 |
| 2010/0262613 A1* | 10/2010 | Gupta | G06F 16/283 |
| | | | 707/755 |
| 2012/0198277 A1* | 8/2012 | Busser | H04L 63/1416 |
| | | | 714/26 |
| 2015/0379429 A1 | 12/2015 | Lee et al. | |
| 2016/0092317 A1* | 3/2016 | Akiyama | H04L 1/0084 |
| | | | 714/20 |
| 2016/0350173 A1* | 12/2016 | Ahad | G06F 11/0751 |
| 2017/0104775 A1* | 4/2017 | Vasseur | H04L 63/1425 |
| 2017/0132068 A1* | 5/2017 | Parra | G06F 11/3409 |
| 2017/0277582 A1* | 9/2017 | Chen | G06F 11/079 |
| 2017/0277727 A1* | 9/2017 | Chen | G06F 21/56 |
| 2017/0279694 A1* | 9/2017 | Sartran | H04L 43/08 |
| 2017/0279832 A1* | 9/2017 | Di Pietro | H04L 63/1425 |

OTHER PUBLICATIONS

Sridhar Ramaswamy, et al., "Efficient Algorithms for Mining Outliers from Large Data Sets", SIGMOD Record, ACM, vol. 29, No. 2, May 16, 2000, pp. 427-438.
Victoria J. Hodge, et al., "A Survey of Outlier Detection Methodologies", Artificial Intelligence Review 22; 2004, pp. 85-126.
U.S. Appl. No. 14/077,158, filed Nov. 11, 2013, Marvin Michael Theimer.
U.S. Appl. No. 15/153,712, filed May 12, 2016, Rajeev Ramnarain Rastogi.
Fei Tony Liu et al, "Isolation Forest", 2008 Eighth IEEE International Conference on Data Mining, Dated Dec. 19, 2008, pp. 413-422.

\* cited by examiner

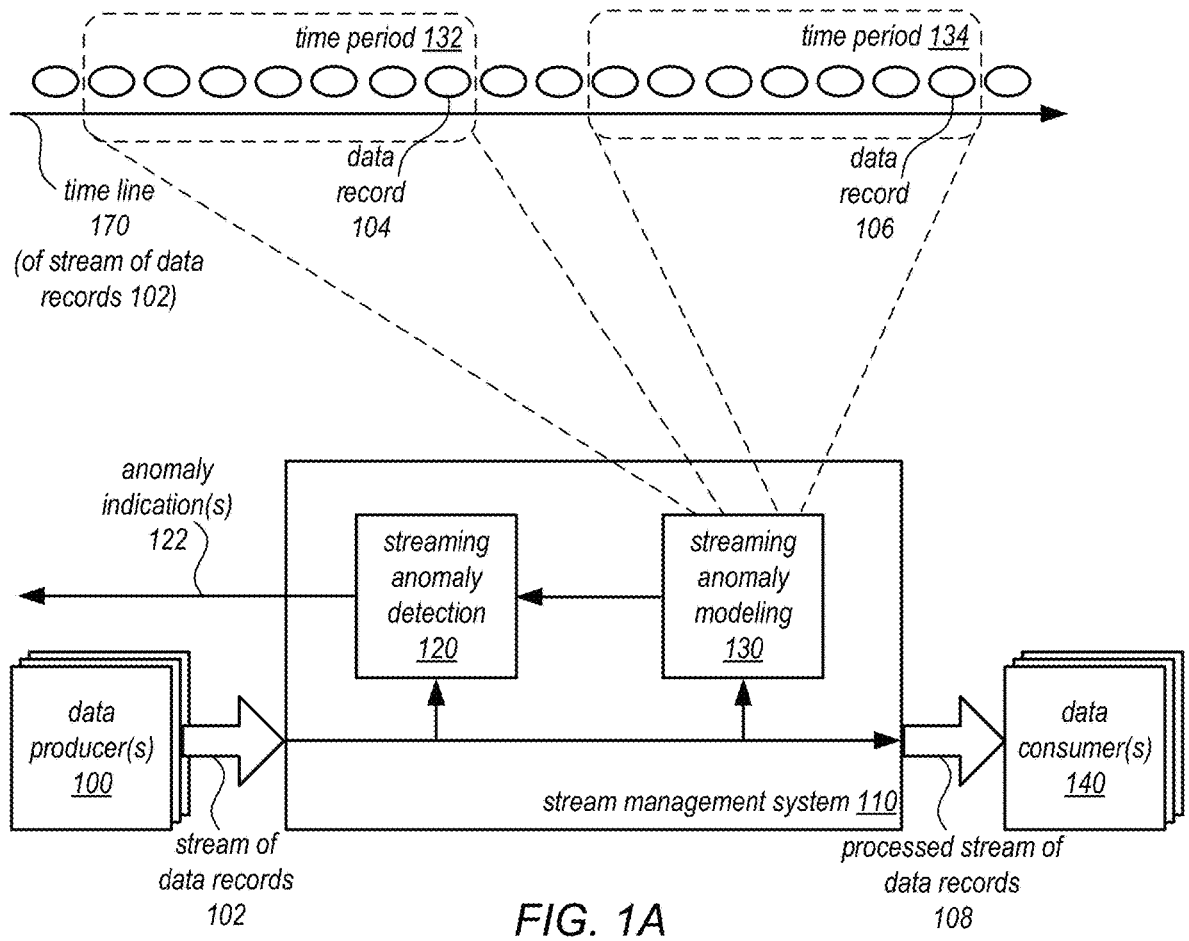
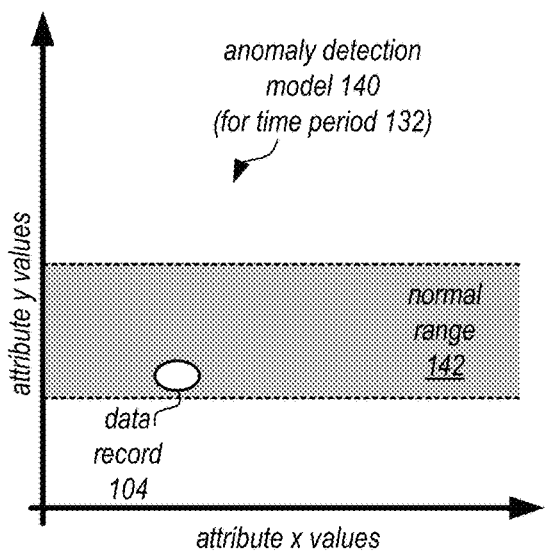
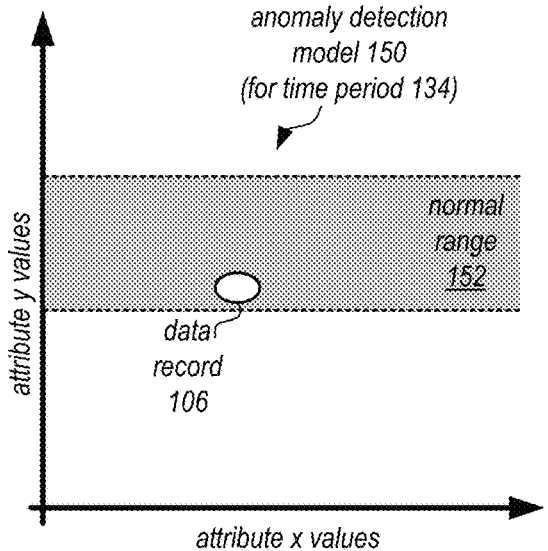

REAL TIME ANOMALY DETECTION FOR DATA STREAMS

This application is a continuation of U.S. patent application Ser. No. 15/084,343, filed Mar. 29, 2016, now U.S. Pat. No. 10,129,118, which is hereby incorporated by reference herein in its entirety.

BACKGROUND

Interconnected devices, such as networked sensors and computing devices, can generate and send data pertinent to various operations, transactions, or other events to remote devices for storage and further analysis. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

Large amounts of such data may be generated and sent in streaming fashion so that the data can be captured in real time. However, over time the volume of streaming data may prove difficult to efficiently analyze as the amount of stored data continues to increase. Analytical techniques that rely upon offline copies or static models of the streaming data may become inefficient when processing the streaming data. Moreover, as streaming data is captured in real time, it may be beneficial in various contexts to provide analysis of streaming data in real time as well. For instance, in some security-related applications or health-related applications, the ability to identify data anomalous data (i.e., unusual data records or data patterns) fairly quickly may be critical.

BRIEF DESCRIPTION OF DRAWINGS

FIG. 1A is a logical block diagram that illustrates real time anomaly detection for data streams, according to at least some embodiments.

FIGS. 1B and 1C illustrate anomaly detection models for different time periods of a data stream, according to some embodiments.

Figure 2:
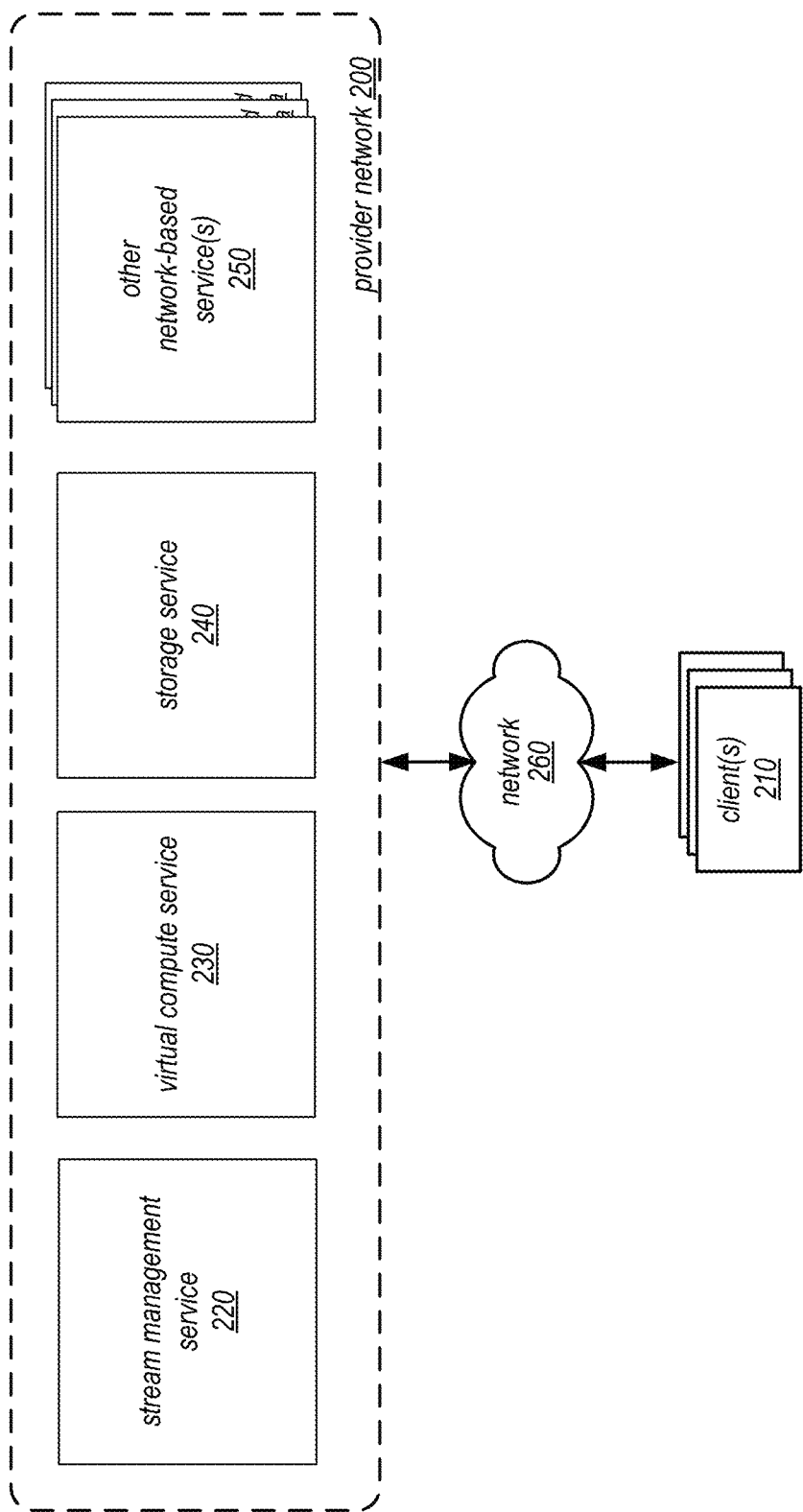
FIG. 2 is a logical block diagram illustrating a provider network that implements a stream management service that provides real time anomaly detection for data streams, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus to implement real time detection of anomalies in data streams are described. The term "data stream", as used herein, refers to a sequence of data records that may be generated by one or more data producers and accessed by one or more data consumers, where each data record is assumed to be an immutable sequence of bytes representing one or more attributes. The records of a stream may also be referred to as observation records, observations, points, or data records herein, and the data producers may be referred to as streaming data sources. A stream management system may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments.

Some customers of the stream management system may develop applications that directly invoke the stream management system programmatic interfaces in various embodiments. In at least some embodiments, however, in addition to the stream management system interfaces, a higher-level abstraction or application-level processing framework may be provided for customers, which may simplify various aspects of stream processing for those clients that do not wish to develop applications using the lower-level stream management functions supported by the stream management system. Such a framework may provide its own programmatic interfaces (built, for example, on top of the stream management system interfaces), enabling customers to focus more on the business logic to be implemented using stream records than on lower-level stream management operations. The higher-level framework may be implemented as part of the stream management system to provide fully managed data stream.

Data streams may be transmitted in real time so that as data records are captured, collected, or otherwise generated, data consumers may be able to read, analyze, modify, or otherwise process the data records. Anomalies, indicated by a measurable difference across one or more attribute values between a data record and one or more other data records in the data stream (also known as outliers), may occur and provide valuable information about the behavior, performance, or operation of various entities associated with the data records, such as unusual, fraudulent, or erroneous user, system, or device behavior, in many different contexts (e.g., health metrics for computing systems, location data for applications in mobile devices, transaction information for retailers or financial institutions, etc.). In various embodiments, a stream management system may provide real time detection of anomalies so that real time responsive actions may be taken in some scenarios. For instance, high temperature values identified as anomalies in a stream of temperature values may be indicative of equipment or other environmental failure in a data center. Upon detecting the high temperature values, corrective measures may be automatically taken, such as directing system shutdown, or enabling cooling measures, notifying operators or stakeholders. Moreover, the detection of such anomalies may be recorded for further analysis, both of the anomalous data record and other data records which may provide further clues as to the cause of the detected anomaly.

FIG. 1A is a logical block diagram that illustrates real time anomaly detection for data streams, according to at least some embodiments. Stream management system 110 may provide a management platform for different streams of data records 102 provided by data producer(s) 100. As noted above, stream management system 110 may facilitate the submission, storage, analysis, transformation and/or retrieval streams of data records 102 so that data consumers 140 may retrieve various forms of raw or transformed streams of data records, processed data records 108, for further operations (storage, analysis, distribution, etc.). Streaming anomaly detection 120 may be implemented by stream management system 110 in order to detect, identify, and respond to anomalies found in streams of data records 102, utilizing streaming anomaly modeling 130. In at least some embodiments, anomaly detection may be performed on all data records of data streams automatically, without explicit requests from a client.

As data records are received, streaming anomaly modeling 130 may generate (e.g., create update) an anomaly detection model that is specific to or maps to a portion of data records in stream of data records 102 over time. Streaming anomaly modeling 130 may, for instance, learn and generate new versions of an anomaly detection model incrementally, so that the anomaly detection model reflects the changes of what constitutes an anomaly for different time periods. In at least some embodiments, the data records may include a time stamp which may indicate, for example, when the data record was generated, when the data record was received, or when the data record was analyzed, in various embodiments. In FIG. 1, the different time periods 132 and 134 within timeline 170 of stream of data records 102, may model anomaly detection based on the data records (or a sample or subset of attribute values of the data records) included in that time period. As new data records are received, the anomaly detection model may change, providing an anomaly detection model that dynamically adapts or learns what is anomalous at a different period of time. FIG. 1B, for example, illustrates an anomaly detection model 140 that is derived from the data records (or a sample of data records) from time period 132. Normal range 142 may illustrate those data records with attributes x and y plotted within model 140. In FIG. 1C, the normal range 152 of anomaly detection model for time period 134 has shifted from normal range 142 based on the updates or changes to the model 150 made for data records in time period 134.

Figure 8:
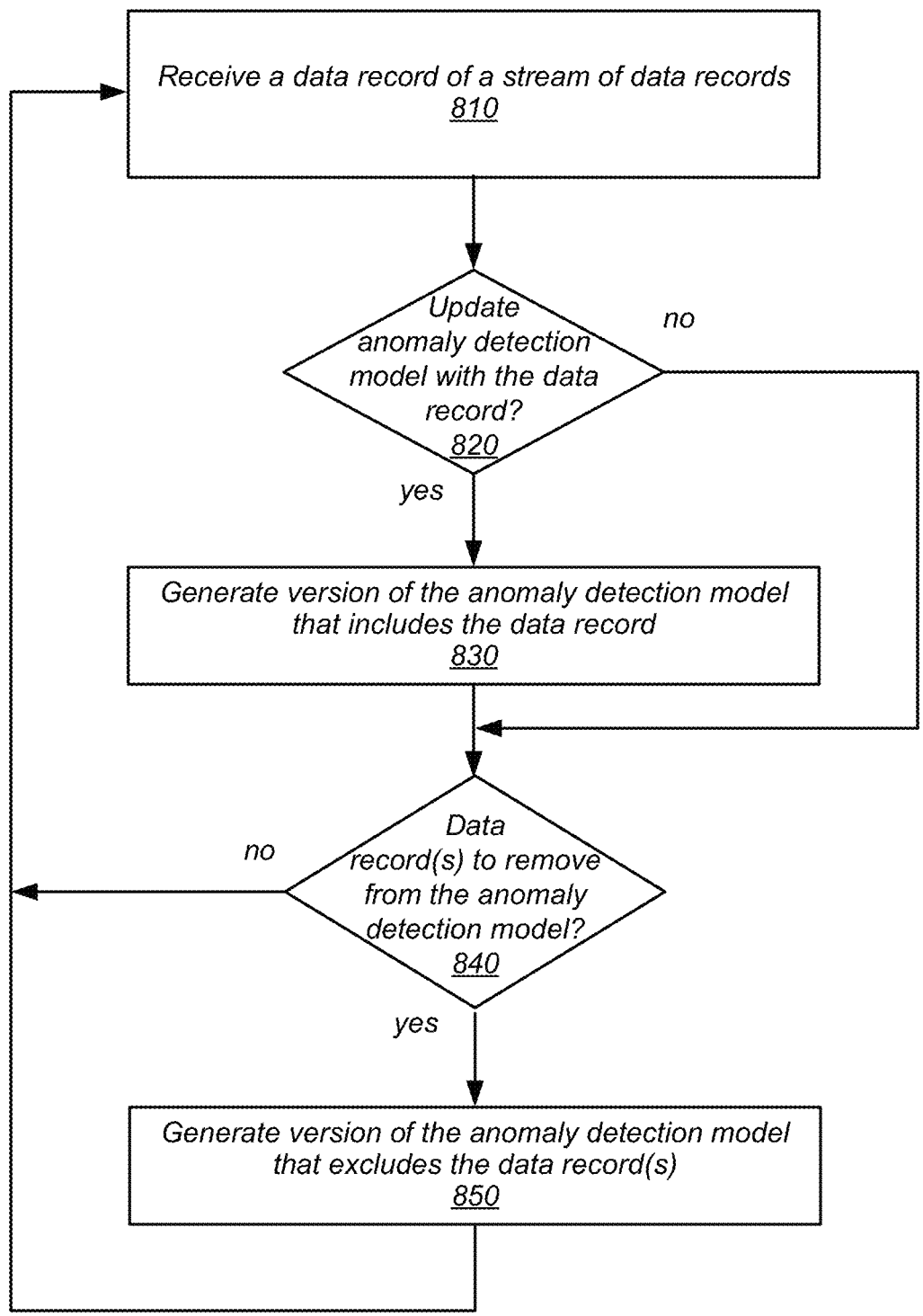
FIG. 8 is a high-level flowchart illustrating various methods and techniques to dynamically generate an anomaly detection model for detecting anomalies in data streams, according to at least some embodiments.

FIG. 8, discussed below, provides further examples of dynamically updating or generating an anomaly detection model as data records are received.

Dynamically updating an anomaly detection model over time allows the anomaly detection model to learn what data is anomalous for particular periods of time (instead of what is anomalous with respect to the entire stream of data records). For those anomaly detection techniques that utilize static anomaly detection modeling, false positive identification of anomalies or false negative identification of anomalies (where anomalous data records are not identified) may occur. When anomaly detection models are dynamically updated over time, however, data records that would have once been identified as anomalous may now be recognized as not anomalous (and vice versa).

Consider a scenario where a computing service experiences peak and off-peak demand. Performance characteristics for the service during peak and off-peak may vary widely. If anomaly detection is running for a stream of performance characteristics, a static anomaly detection model may be unable to distinguish scenarios where a performance characteristic that is normally seen during peak demand (e.g., high power utilization) is anomalous when observed during an off-peak time period (e.g., when power utilization may be much lower). A static anomaly detection model would determine that the high power utilization is not anomalous, as such a high utilization is considered normal (albeit during peak service demand). However, such an anomalous event may be valuable to detect for the service (e.g., may indicate equipment failure or malicious/unauthorized use of the service). Machine learning and other dynamic modeling techniques may be employed to update (or generate) an anomaly detection model that would be particular to the period of time in which the data record indicating the high power utilization is detected (e.g., an off-peak anomaly detection model). This dynamically updated anomaly detection model would then indicate that the high power utilization was anomalous for the off-peak period.

Streaming anomaly modeling 130 can apply various different modeling techniques to characterize anomalies in streams of data records 102 dynamically. For example, various isolation techniques, such as a streaming random cut forest technique as described in U.S. Provisional application Ser. No. 14/990,175 entitled "Outlier Detection for Streaming Data" filed Jan. 7, 2016, the content of which is incorporated by reference herein in its entirety, may be applied to generate anomaly detection models that can be used to identify data records that are isolated and therefore anomalous when compared to other data records included in the anomalous detection model. Various other modeling techniques, such as determining the distribution of data records (based on attribute values thereof) within a time period, measuring the rate of change for attribute values of data records (including rate of changing distributions) within a time period, and/or discovering/applying normal operating parameters for a time period, may be implemented in various embodiments to identify anomalies in data streams in real time.

Stream management system 110 may implement streaming anomaly detection 120 to monitor, detect, or otherwise identify anomalies within streams of data records 102. For example, streaming anomaly detection 120 may determine a distance value (or some other difference value) based on one or more attribute values of the data record and other data records obtained by accessing an anomaly detection model 130 that corresponds to the time period of the data record. The anomaly detection model for the time period of the data record may indicate a threshold value, which if the determined distance value exceeds, the data record may be considered anomalous. Thus, streaming anomaly detection 120 may access anomaly detection models updated by anomaly modeling 130 in order to evaluate a model with respect to a received data record.

Consider the illustrated example in FIGS. 1A and 1B. When data record 104 in stream of data records 102 is received, anomaly detection 120 may determine a plot or location for data record 140 within anomaly detection model 140. When evaluated with respect to normal range 142 in anomaly detection model 140, data record 104 may not be identified as an anomaly. Note that after an updated version of the anomaly detection model, model 150 in FIG. 1C, is generated, by including the data records of time period 134, data record 104 would be considered anomalous (as it would not be within normal range 152) if it were evaluated with respect to anomaly detection model 150. Anomaly detection 120 may perform various types of anomaly detection with respect to anomaly detection models. As noted above, various types of isolation-based anomaly detection, distribution-based anomaly detection, rate-of-change-based anomaly detection, or operating parameter-based detection may be performed.

Figure 4:
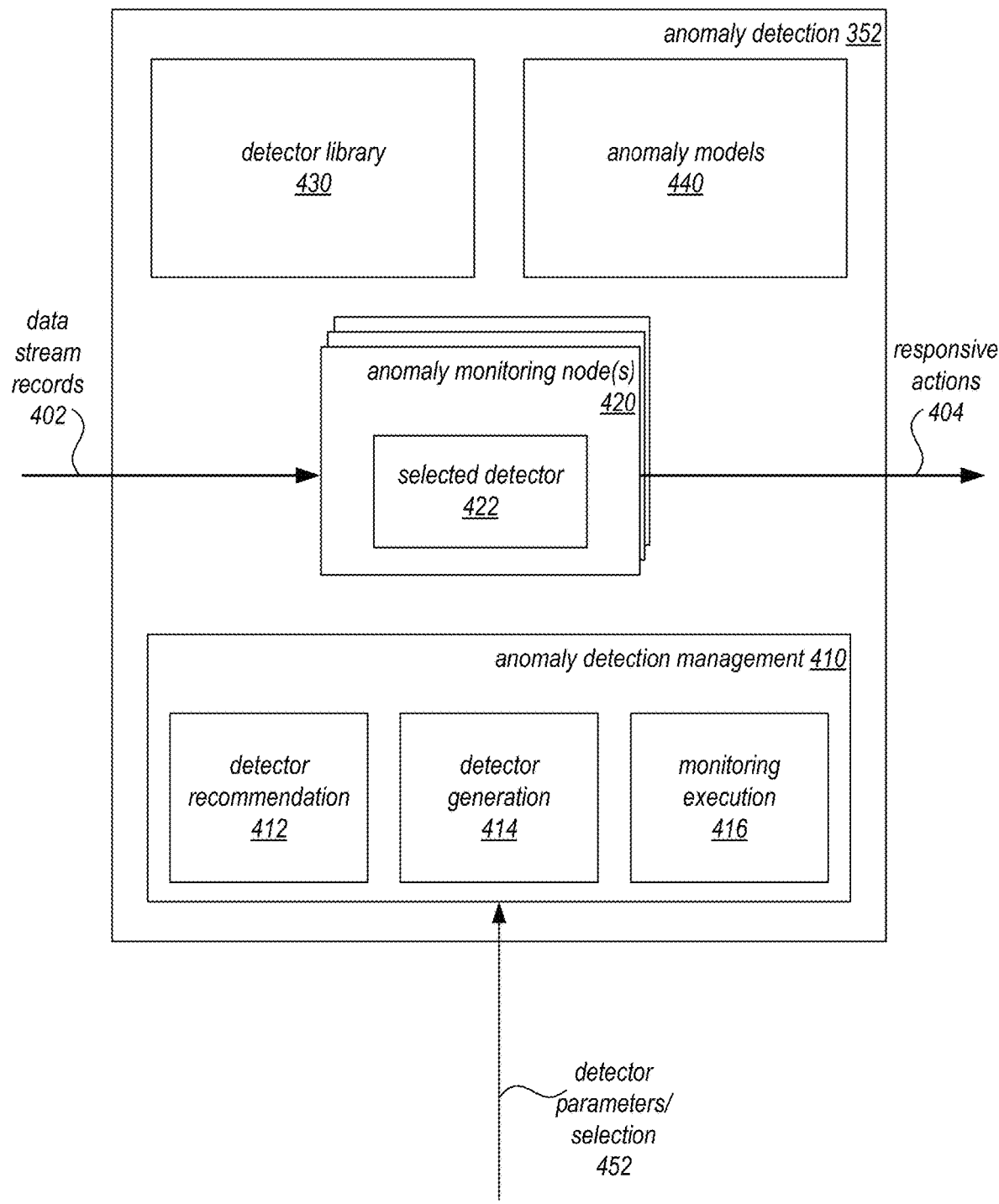
FIG. 4 is a logical block diagram of an anomaly detection system, according to at least some embodiments.
Figure 5:
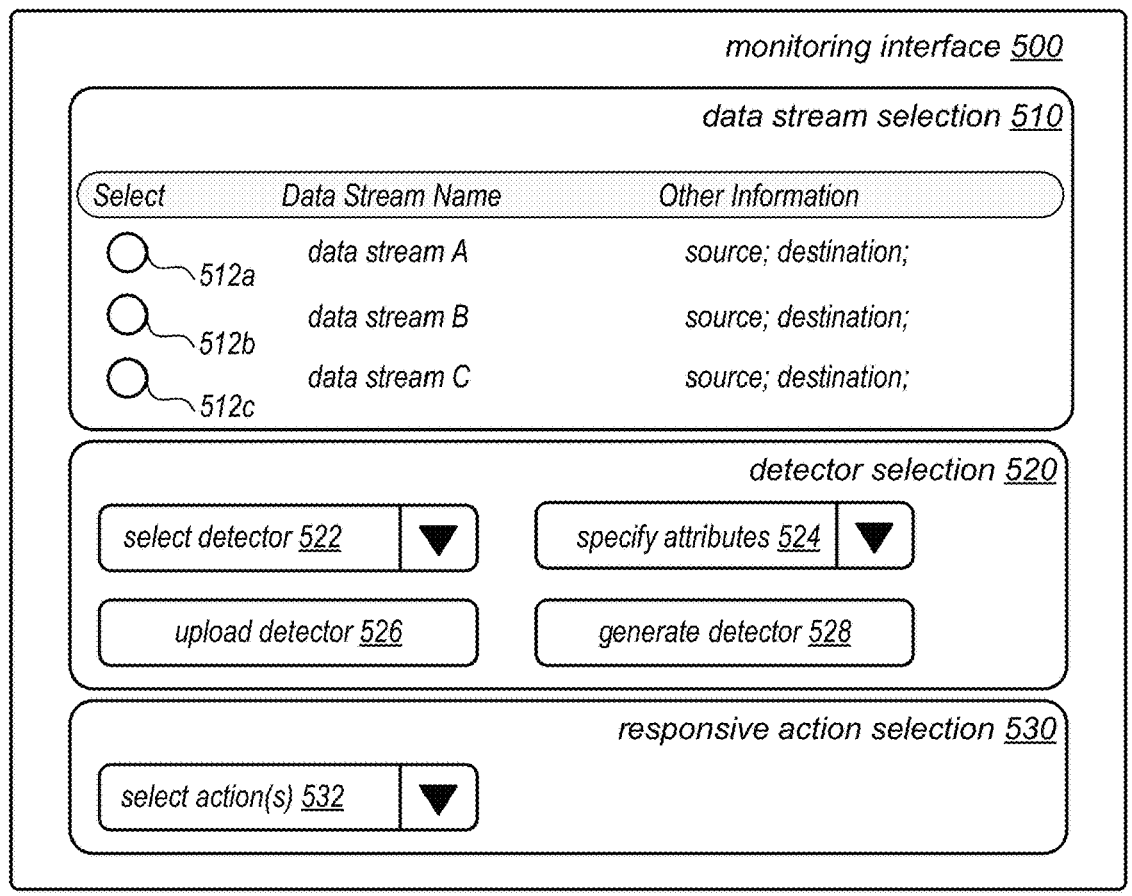
FIG. 5 is an example of a graphical user interface for configuring the performance of real time anomaly detection for data streams, according to at least some embodiments.

In some embodiments, clients of data stream management 110 may be offered a selection of multiple different anomaly detectors (employing different respective anomaly detection techniques), as discussed below with regard to FIGS. 4 and 5. A client may also upload an anomaly detector to be implemented at stream management system 110 for a stream of data records. In some embodiments, various attributes, parameters, or thresholds to define an anomaly may be provided and a corresponding anomaly detector generated to detect the defined anomaly, which may be implemented at stream management system 110 for a stream of data records. Recommendations of anomaly detectors may be made to clients, in some embodiments. Multiple different anomaly detectors may be employed to monitor the same data stream (for the same or different anomalies), as different anomaly detectors may be employed to monitor different streams of data records.

Anomaly detection 120 may provide indications of anomalies 122 which may trigger the performance of various responsive actions by stream management system 110 or other systems, components, or devices. For example, automated corrective actions may be performed in response to the detection or indication of an anomaly in a stream of data records to halt the operation of a device that emitted the anomalous data metric. In some embodiments, identified anomalies may be flagged or marked for further analysis, by a different type of anomaly detector that operates utilizing a more costly, or may be filtered or removed from the stream of data records.

Please note that previous descriptions are not intended to be limiting, but are merely provided as a logical example of real time anomaly detection of data streams.

This specification begins with a general description of a provider network, which may implement a stream management service that provides real time anomaly detection for data streams managed by the stream management service. Then various examples of a stream management service are discussed, including different components/modules, or arrangements of components/module that may be employed as part of providing real time anomaly detection in a data stream hosted in the stream management service. A number of different methods and techniques to implement real time anomaly detection are then discussed, some of which are illustrated in accompanying flowcharts. Finally, a description of an example computing system upon which the various components, modules, systems, devices, and/or nodes may be implemented is provided. Various examples are provided throughout the specification.

Figure 3:
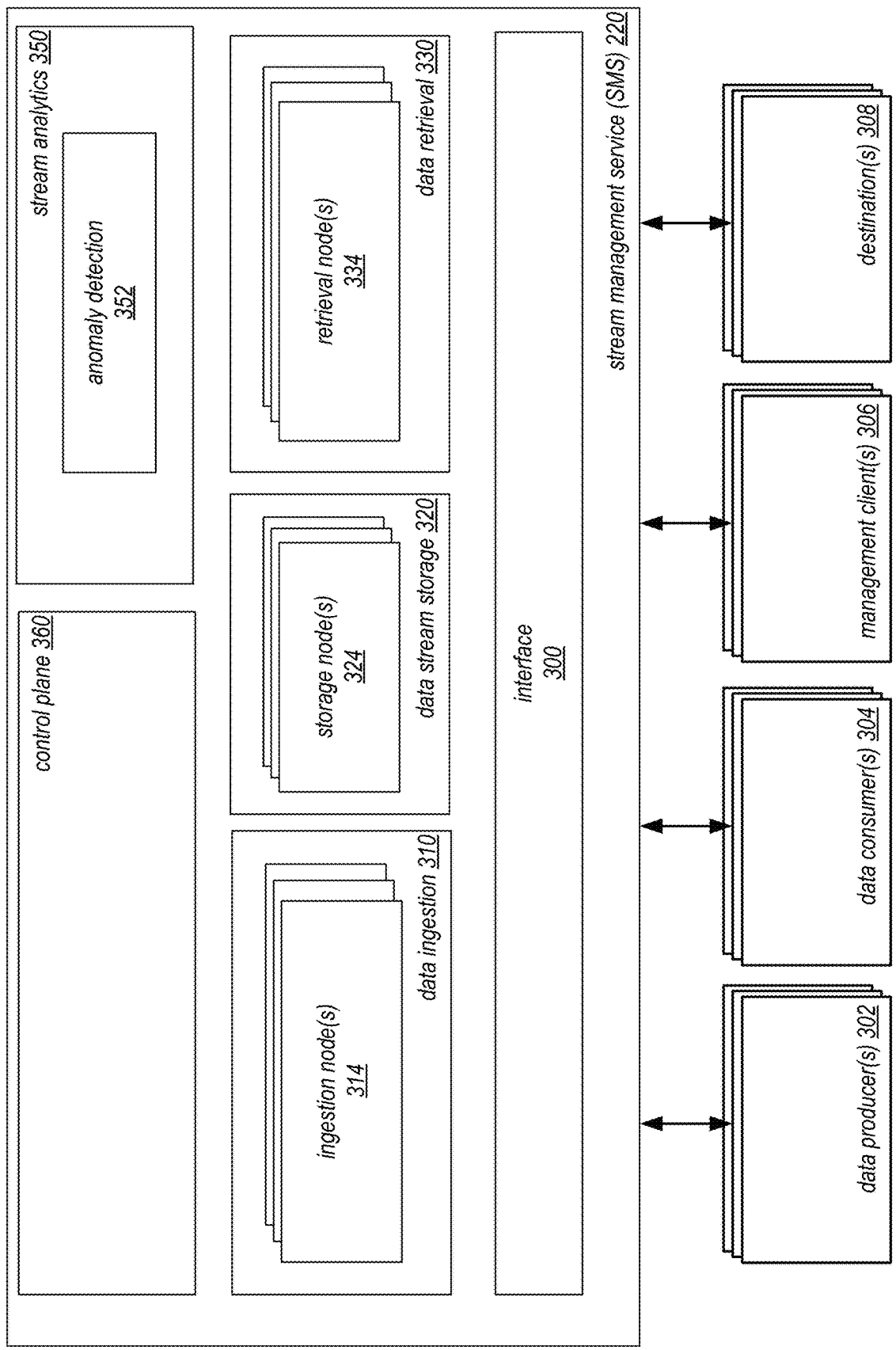
FIG. 3 is a logical block diagram of a stream management service, according to at least some embodiments.

FIG. 2 is a logical block diagram illustrating a provider network that implements a stream management service that provides real time anomaly detection for data streams, according to at least some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement a stream management service 220, described in detail below with regard to FIG. 3, provide computing resources, such as virtual compute service 230 and storage services 240, such as object storage services, block-based storage services, data warehouse storage services, and/or any other type of network based services 270 (which may include various other types of storage, processing, analysis, communication, and security services). Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may be implemented as data producers or data consumers for a data stream managed by stream management service 220 and services such as storage service 240, may serve as destinations for data records in the data stream, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Storage service 240 may include various types of storage services, such as different types of storage schemes. An object-based data store may be implemented, in various embodiments, to provide highly durable storage for data objects, such as data records stored as part of a data stream managed by stream management service 220. For instance, the object-based data store may be implemented as a key-value data store, where a data object is associated with a unique key. The key for the data object is used to access or manage the data object stored in the object-based data store. Storage service 240 may also include a data warehouse, in various embodiments, to set up, operate, and scale a data warehouse in a cloud computing environment. Data warehouse clusters hosted by the data warehouse may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Other network-based services 250 may include various services, including services configure networking of client provider network resources (e.g., load balancing), security (e.g., firewalls, access control), or data processing. In at least some embodiments, other network-based services may include a distributed processing service to provide one or more distributed processing clusters to perform processing jobs on large sets of data, including data streams managed by stream management service 220. For instance, a stream of data records may be retrieved from stream management service 220 and made available to one or more processing clusters of the distributed processing service on behalf of a customer in order to perform filtering and sorting of data records in the stream and processing on the data in accordance with a framework that manages the operations of the cluster to run tasks in parallel, communicate and transfer data amongst nodes in the cluster, and facilitate redundancy and fault tolerance of the data and operations (e.g., as may be provided utilizing a MapReduce framework).

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

FIG. 3 is a logical block diagram of a stream management service, according to at least some embodiments. Stream management service 220 may ingest data from one or multiple sources for a data stream, store the data in the data stream and provide access to the data for service-provided consumers or processors of the data or externally located (with respect to stream management service) consumers or processors of the data. As illustrated in FIG. 3, data ingestion 310, data stream storage 320, and data retrieval 330, may implement such functionality on behalf of stream management service (SMS) 220. Data producer(s) 302, management client(s) 306, and other service(s) 308, may interact with SMS 220 via interface 300. Control plane 360 may manage the provisioning, operation, networking, and other operations of the various systems in SMS 220 (e.g., provisioning and/or configuring ingestion nodes(s) 314, storage node(s) 324, and retrieval node(s) 334.

In various embodiments, SMS 220 may implement stream analytics 350. Stream analytics 350 may provide a fully managed service for performing real time processing on data streams managed by SMS 220. Various programmatic interfaces, such as graphical users interfaces, command line interfaces, or interpreters or execution platforms for various programming or scripting languages (e.g. Server Query Language (SQL)) may be implemented to allow clients, such as management client(s) 306, to specify or define different processing techniques to be applied to streams of data, such as data filters, data transformers, or data aggregators. Stream analytics 350 may provide a library of various real time operations to be performed upon data streams which can be selected by management client(s) 306 for execution. In this way, many different streaming applications can be quickly designed and implemented for different stream processing needs. Stream analytics 350 may also implement anomaly detection 352, which may provide automated monitoring of data streams for anomalies, as discussed in detail below with regard to FIG. 4. Although illustrated as part of stream management service 220 in FIG. 3, in some embodiments, stream analytics 350 and/or anomaly detection 352 (illustrated and discussed below with regard to FIG. 4) may be implemented as a standalone or separate system or service that processes data streams from multiple sources, including data streams managed by stream management service 220.

Data ingestion system 310 may include one or more nodes 314 or components to ingest data. Nodes 314 of the ingestion system 310 may be configured (e.g., by nodes implementing control plane 360) to obtain data records of a particular data stream from data producers 302. In some embodiments, ingestion nodes 314 may obtain the data records according to a scheme for partitioning the data stream. The partitioning scheme may be selected by a client of SMS 220 for a data stream such that data records are received from data producer(s) 302 indicating the particular partition to which the data record belongs (e.g., by including a partition key as discussed above). Such data records may be directed to those ingestion node(s) 314 responsible for the particular partition (e.g., nodes assigned to the partition by partition assignment 332). However, in some embodiments, a data stream may be fully managed by SMS 220 and data producer(s) 302 may send data records without any direction for partitioning (e.g., with no partitioning key). Instead, data ingestion system 310 (in accordance with decisions performed by routing system 312) may assign data records to route the data records to ingestion node(s) 314 for the identified partition (e.g., by assigning a partition key to a data record that corresponds to the partition to which the data record is to be routed). In this way, partition utilization information (which may be tracked by control plane 360 may inform routing decisions to ensure that each partition of a data stream is fully utilized. Then ingestion nodes 314 may pass obtained data records on to corresponding storage nodes 324 (provisioned for a partition of the data stream according to control plane 360) of the data stream storage system 320. Storage node(s) 324 may record, save, store or otherwise persist the data records on any of various types of storage devices (which may be performed in accordance with a persistence policy for the data stream).

In order to retrieve data from the data stream, retrieval node(s) 334 of data retrieval system 330 may access the storage node(s) 334 corresponding to a partition assigned to the data retrieval node. In some embodiments, data retrieval node(s) 324 may respond to read requests from data consumer(s) 304. For fully-managed data streams, processing worker nodes(s) 324 may act as data consumers, performing operations to process the data records and deliver the data records to specified destination(s) 308, such as another service in provider network 200, like storage service 240, or other network-based service 270 (e.g., to a distributed processing service), or to a service, system, or destination outside of provider network 200.

In order to coordinate the operation of various subsystems within SMS 220, control plane 360 may implement various management functions. For example, partition utilization tracking may be implemented to collect utilization data from ingestion node(s) 314, storage node(s) 324, and data retrieval node(s) 334. Partition utilization data may include measures that indicate the utilization of storage (e.g., available bytes), network (e.g., available bandwidth), and processing resources (e.g., available throughput processing capacity) to perform ingestion, storage, processing and/or backfilling of data in a data stream. The partition utilization data may be aggregated or evaluated on a per partition basis in order to make various control plane determinations. For example, in at least some embodiments, control plane 360 may direct data records put into a data stream by a data producer 302 to one of the partitions of a data stream based on the utilization of the different partitions of the data stream (e.g., utilization at data ingestion 310, data stream storage 320, or data retrieval 330). Similarly, control plane 360 may detect repartitioning events to modify the number (e.g., increase or decrease) of partitions in a data stream automatically (without a user request to repartition). For example, if utilization data indicates that the throughput capacity of ingestion node(s) 314, storage node(s) 324, or data retrieval nodes(s) 334 assigned to the partitions of a data stream is near full utilization, control plane 360 may initiate a split operation for one or multiple partitions of the data stream to increase the number of partitions. Thus, control plane 360 may manage the provisioning of additional ingestion node(s) 314, storage node(s) 324, and data retrieval node(s) 334 to host or service the new partitions. Partition assignments 332 for the various ingestion node(s) 314, storage node(s) 324, or data retrieval node(s) 334 to partitions of respective data streams may be performed based on partition utilization data, whether performed upon creation of a data stream or as part of efforts to balance or redistribute the assignments of partitions in order to more efficiently utilize SMS 220 resources. Other partition metadata, including information describing the state of a data stream or configuration of a data stream (e.g., partitioning schemes, fully-managed or client-managed) may also be managed, maintained, and utilized by control plane 360.

Interface 300 of SMS 220 support one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by SMS 220 to utilize requests, sending a "putRecord" request to SMS 220 via interface 300. Similarly, data consumer(s) 304 which are implemented separately from SMS 220 may be configured to access SMS 220 via interface 300 and utilize the client library provided by SMS 220 to "getNextRecords" when executing an application to retrieve the next data records to be processed in the data stream.

Stream analytics 350 may be performed upon ingestion of data records after data ingestion 310 as the data records are received or upon retrieval of data records by data retrieval 330 to monitor a data stream for anomalies in real time. FIG. 4 is a logical block diagram of an anomaly detection system, according to at least some embodiments, which may be implemented to monitor data streams. Anomaly detection 352 may implement anomaly detection management 410 to coordinate the operation of anomaly monitoring node(s) 420, which may implement one or more selected anomaly detectors 422 to identify anomalies within data stream records 402. In at least some embodiments, anomaly monitoring nodes 420 may initiate, request, or perform various responsive actions 404 for detected anomalies.

Figure 9:
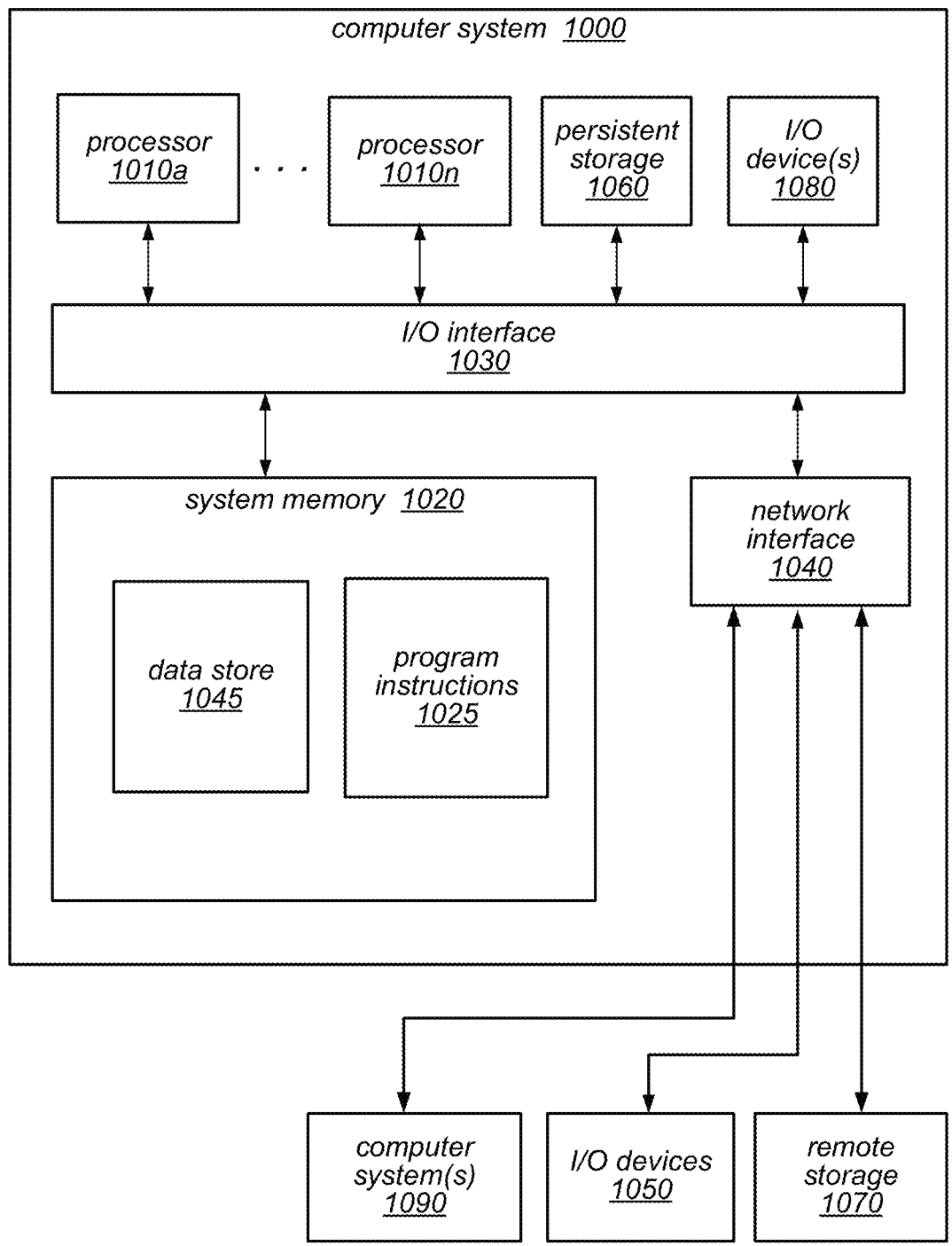
FIG. 9 is a block diagram illustrating an example computing system that may be used in at least some embodiments.

Anomaly monitoring node(s) 420 may be implemented by one or more computing devices, such as computing system 1000 described below with respect to FIG. 9, to implement one or more selected detectors 422. Selected detector 422 may be an executable or component (e.g., storage or other execution engine) that is implemented by anomaly monitoring node(s) 420 to monitor a data stream according to a real time anomaly detection technique. For instance, various, different types of anomaly detectors may be implemented. In some embodiments, isolation techniques may be utilized to identify if a received data record contains an attribute value that is different from other received attribute values for other previously received data records stream 402. Other detection techniques, such as techniques that monitor a rate of change for attribute values, distribution of attribute values, attribute values with respect to various thresholds or normal operating parameters may be implemented, as discussed below with regard to FIG. 7 and may be implemented by anomaly monitoring nodes. Anomaly monitoring nodes 420 may access various anomaly models 440, which may be maintained or updated by anomaly monitoring node(s) 420 as data records are received, as discussed below with regard to FIG. 8. For instance, anomaly models may store data used to evaluate whether or not a data record is anomalous (e.g., by storing threshold values for scores or other difference measures generated by selected detector 422). Anomaly models 440 may be dynamically updated so that updated versions of anomaly models describe changes to anomaly detection models over time so that an anomaly model 440 accessed for a first data record when it is received may be changed when accessed and evaluated again for a subsequently received data record.

For identified or detected anomalies, anomaly monitoring node(s) 420 may initiate, request, or direct responsive actions 404. Responsive actions 404 may be specified by clients of SMS 220 in some embodiments. For instance, a client may identify a communication method and recipient for a particular anomaly that is detected so that a message is sent via the specified communication method (e.g., short message service (SMS) text to a particular phone number). Various corrective actions may be specified, or further types of anomaly analysis may be invoked. If, for example, an anomaly is detected indicating that spike in network traffic is directed to a particular network location at a certain time of day, then various pattern or behavior recognition analysis on may be performed to determine whether or not the spike in network traffic is likely to be malicious. As discussed below with regard to FIGS. 5. And 6, various types of responsive actions may be specified by a client.

Detector library 430 may be a repository of various anomaly detectors which may be deployed or implemented at anomaly monitoring nodes 420. In at least some embodiments, clients of SMS 220 may upload anomaly detectors (e.g., by uploading a source code file) which may be compiled and made available for execution for other users. In this way, different types of anomaly detectors that are configured to identify different types of anomalies may be shared amongst clients of SMS 220.

Anomaly detection management 410 may be implemented to direct the execution of anomaly monitoring at anomaly monitoring nodes(s) 420. Monitoring execution 416, for instance, may be implemented to provision an anomaly monitoring node 420 and load a selected detector 422 at an anomaly monitoring node 420. In various embodiments, monitoring execution 416 may configure responsive actions 404 to be taken by anomaly monitoring nodes 420. Requests 452 to specify a selected anomaly detector, as well as detector parameters (e.g., attributes for anomaly detection modeling and evaluation). For example, a request 452 may identify an isolation-based anomaly detector in detector library 430 along with the identity of the data stream and attribute values to monitor in the data stream.

In some embodiments, anomaly detection management 410 may implement a detector recommendation engine 412, which may analyze a given data stream or anomaly and recommend one of the detectors from detector library 430 to a requesting client. Anomaly detection results and other performance data from anomaly detectors may be stored (not illustrated) so that various learning techniques may be employed to identify those anomaly detectors with greatest anomaly detection success for the given anomaly or for data streams with similar attributes. In some embodiments, anomaly detection management 410 may implement detector generation 414, which receive as input an anomaly and detector parameters. Detector generation 414 may then generate an executable or script/code (which may be used to generate an executable) that can perform monitoring for the input anomaly for a data stream.

As noted above, clients of SMS 220 can configure the performance of real time anomaly monitoring on data streams via an interface. FIG. 5 is an example of a graphical user interface for configuring the performance of real time anomaly detection for data streams, according to at least some embodiments. Monitoring interface 500 may implement a data stream selection element 510, which may provide various user interface elements, 512a, 512b, and

512c, to present those data streams for which anomaly monitoring may be enabled and/or configured. For example, a list of different streams, such as data stream A, B, and C may be displayed, along with various other information about the data stream (e.g., data stream source, destination). In some embodiments, such a list may be populated based on a selected detector or by a listing of data streams associated with a particular client account.

Monitoring interface 500 may also implement detector selection element 520. In some embodiments, stored detectors (e.g., from detector library 430) may be provided in a user interface element, such as drop-down selection list 522. In some embodiments, an interface element may be provided 526 to upload or transmit a client implement anomaly detector which may be implemented for the client or shared with or other clients for use in monitoring data streams for other clients. For example, a client may upload a specified function or code snippet which may be executed. In some embodiments, an interface element 528 may be provided which initiates a request to generate an anomaly detector based on various input information. For instance, an anomaly definition (e.g., threshold values), attribute values, data stream, and other information may be specified which can be used to generate an executable (or script/code snippet that can be executed) in order to detect the defined anomaly based on the specified attribute values (e.g., according to threshold values dynamically updated in the anomaly detection model generated for the data stream).

Monitoring interface 500 may implement responsive action selection element 530. A drop down menu, such as selection action(s) menu 532 or various other user interface elements may be implemented which allows a user to specify one or more responsive actions to be performed when an anomaly is detected. For instance, attribute values to insert, modify, or score may be specified for inclusion in an anomalous data record identified by a selected detector as a responsive action to perform.

Figure 6:
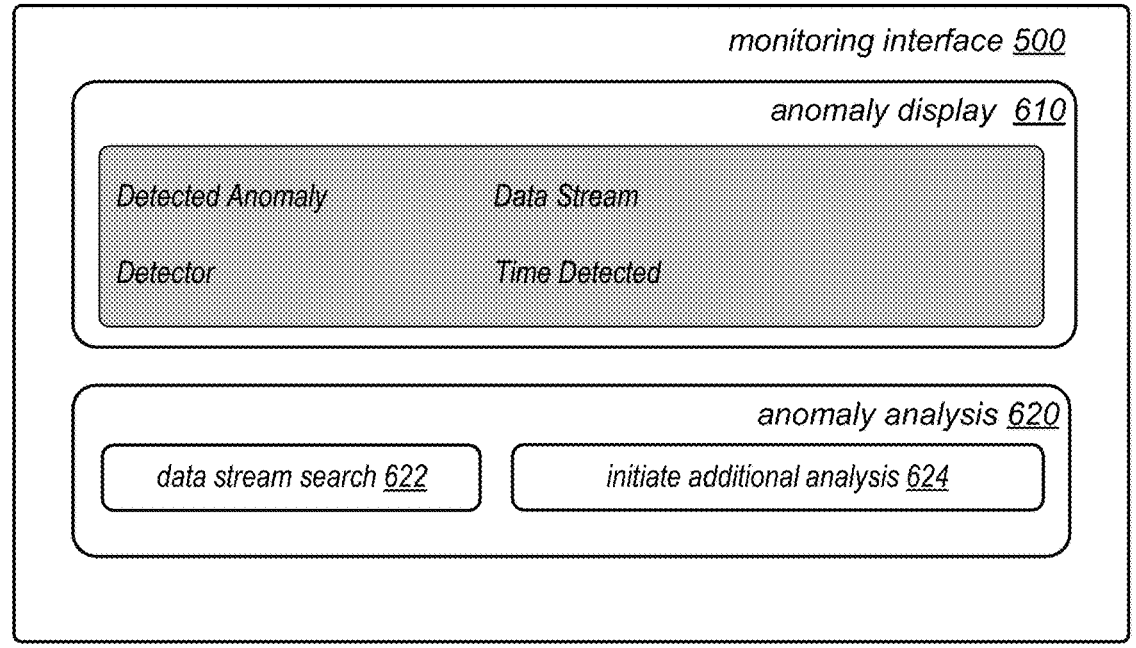
FIG. 6 is an example of a graphical user interface for analyzing detected anomalies detected in a data stream in real time, according to at least some embodiments.

In some embodiments, detected anomalies may be indicated via a graphical user interface in order to allow for subsequent analysis or responsive actions to be selected and performed. FIG. 6 is an example of a graphical user interface for analyzing detected anomalies detected in a data stream in real time, according to at least some embodiments. Monitoring interface 500 may implement anomaly display 610 which may provide various details about the selected anomaly. For instance, the type of detected anomaly may be named, as well as the data stream in which it was detected. The identified anomaly may have various metadata, such as a timestamp or other indication as to when the anomaly was detected within the data stream displayed as well. In addition to performing the various selected responsive actions above, in some embodiments, monitoring interface may implement an analysis interface 620. Anomaly analysis interface may provide further tools to analyze the identified anomaly. For instance, data stream search element 622 may be provide an interface to search for and retrieve data records in the data stream in which the anomaly was detected (e.g., data records stored in record storage 320). In this way, an investigation as to the attribute values of other data records in the data stream may be performed to identify trends, patterns, or causes of the anomaly. In some embodiments, an interface element may be provided to initiate additional analysis 624. For example, some types of anomalies may be related to critical infrastructure for which further analysis may be necessary before certain responsive actions are taken. Element 624 may allow a client to specify additional, more costly, and/or non-streaming analysis for data sets associated with the data record or detected anomaly. For example, if the anomaly identifies possible fraudulent user behavior, then other data sets associated with the user may be selected and analyzed for comparison with the anomalous event.

The examples of real time anomaly detection in data streams as discussed above with regard to FIGS. 2-6 have been given in regard to a stream management service and/or other network-based services. Various other types or configurations of distributed systems processing data from a data stream may implement these techniques. For example, large-scale distributed environments operated by a single business entity may implement idempotent processing of data streams for its own applications. Moreover, different configurations of the various modules, components, systems, and or services described above that may implement real time anomaly detection in data streams may be configured to perform real time anomaly detection in data streams. Thus the stream management service discussed above serves as one example context in which many of the stream management and processing techniques described herein may be implemented. However, the techniques discussed below with regard to FIGS. 6 and 7 may be also implemented using anomaly monitoring nodes as discussed above.

Figure 7:
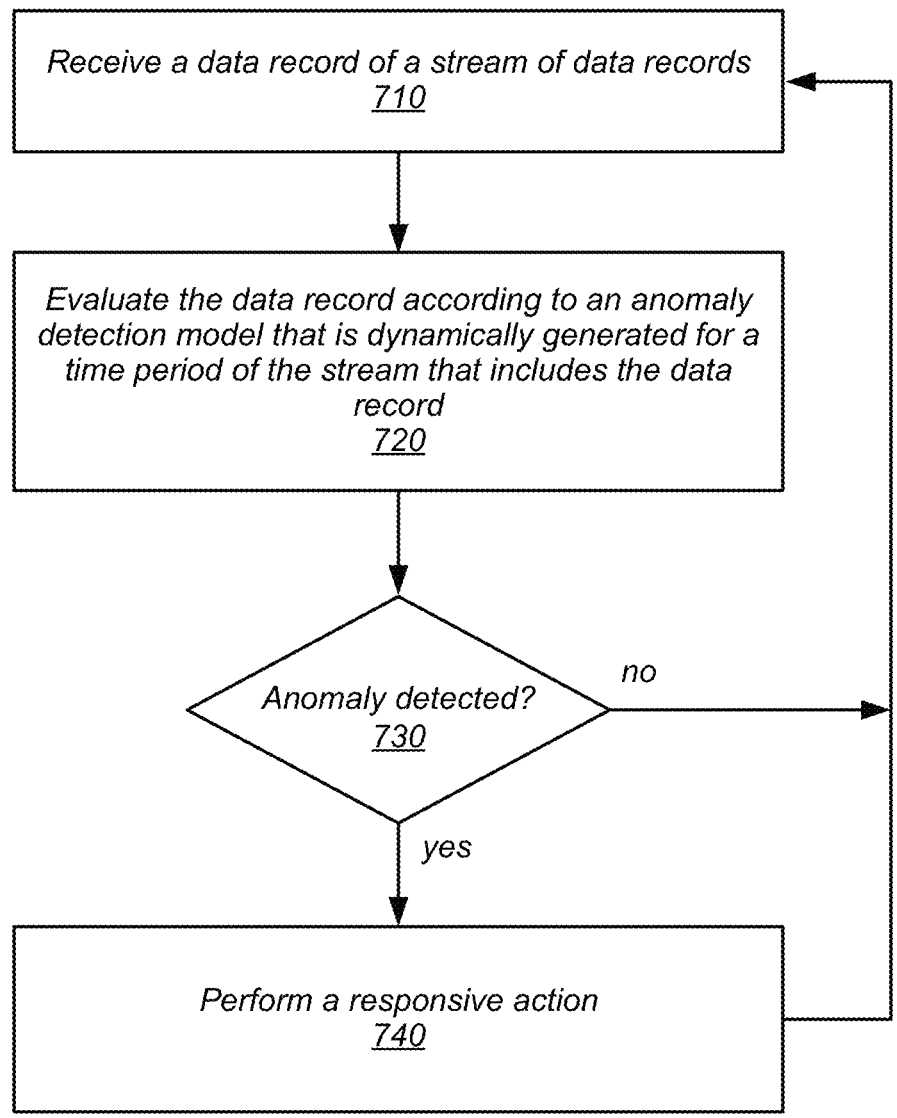
FIG. 7 is a high-level flowchart illustrating various methods and techniques to monitor a data stream for anomalies in real time, according to at least some embodiments.

FIG. 7 is a high-level flowchart illustrating various methods and techniques to monitor a data stream for anomalies in real time, according to at least some embodiments. Monitoring of a stream of data records for anomalies may be performed by monitoring measurable differences amongst the data records of the stream that exceed a threshold identified by a detection model. For instance a distance measure or other difference value may be calculated by plotting attribute values and comparing them with a threshold value or with other data records within the stream (e.g., a clustering analysis technique) that act as a threshold. Such monitoring may be repeatedly performed as data records in the data stream are received so that each data record may be checked for an anomaly. For instance, as indicated at 710, a data record of a stream of data records may be received. Real time monitoring of anomalies for the data stream may be enabled so each data record in a data stream may be analyzed for anomalies.

As indicated at 720, in various embodiments, the data record may be evaluated according to an anomaly detection model that is dynamically generated for a time period of the stream that includes the data record. For instance, a time period of the data stream may be utilized to map or otherwise associate an anomaly detection model with one or more data records of a stream so that anomaly identifications made with respect to those data records are not influenced by data records of a prior time period. For example, if an anomaly detection model is dynamically generated for health information (e.g., heart rate values for an individual wearing a mobile heart rate monitoring device), the threshold between normal and abnormal heart rate values may change according to the heart rate values provided for different time periods. If for a period of time the individual is sleeping, then the abnormal heart rate threshold may be dynamically updated to a lower value which would not be abnormal during a time period in which heavy physical exertion occurs (e.g., exercise). As the individual transitions from different types of activities, time periods associated with different activities can accurately identify normal and abnormal heart rates for those time periods, allowing the model to learn the abnormal threshold value for the individual in real time. FIG. 8 describes various techniques for dynamically updating an anomaly detection model.

Different anomaly detection techniques and thus different anomaly detection models may be utilized in various embodiments. For example, in at least some embodiments, an anomaly detection model may be described as a distribution of attribute values for data records within the time period (or sample of data records within a time period). A distribution of attribute values, such as age range for data records in a stream of data records describing web site users, may be tracked in an anomaly detection model. As new data records are received, the distribution of attribute values may be updated. If sudden changes in the distribution of attribute values may be detected as anomalies (e.g., 10% users ages 12-17 jumps to 80% of the total distribution of users or some other percentage beyond a standard deviation or other threshold for user age range distribution).

In some embodiments, threshold values may be maintained in an anomaly detection model. As the anomaly detection model is updated, the threshold values may change. For example, if thresholds for normal values are determined based on ±5 of an average of the values of the attributes in a time period, then the threshold values may be dynamically adjusted over time as the attribute values of different time periods may have different averages. In some embodiments, normal operating parameters may be specified as an anomaly detection model so that the model may be dynamically updated to reflect changing definitions of "normal" over time. For instance, normal operating parameters may be specified as a function of time so that that the anomaly detection model may be updated according to the function so that anomalies in a current time can be detected.

If no anomaly is detected for the data record according to an evaluation of the anomaly detection model, as indicated by the negative exit from 730, then evaluation of the next received data record in the stream may begin. If however, an anomaly is detected, then a responsive action for the anomaly may be performed, as indicated at 740. One or multiple responsive actions may be performed for a detected anomaly. For example, a notification of the anomaly may be sent, and an operational request or command sent to a device that is causing the anomaly (e.g., a reboot or rollback command). In some embodiments, the responsive action may be an invocation of a different form of anomaly analysis with respect to the data record or an initiation of an analysis with respect to one or more sets of data associated with the data record (or source of the data record). In at least some embodiments, a responsive action may be to filter the data record, insert additional information with the data record, or display the data record or detected anomaly via an interface (as described above with regard to FIG. 6). Identified anomalies (and the anomalous data records) may be stored as part of a log or other data store that indicates the occurrence of anomalies for a data stream.

FIG. 8 is a high-level flowchart illustrating various methods and techniques to dynamically generate an anomaly detection model for detecting anomalies in data streams, according to at least some embodiments. As with anomaly detection, anomaly detection models may be updated in streaming fashion so that anomaly detection models may be dynamically changed to reflect different time periods. Such different detection models may be stored as separate versions of an anomaly detection model or maintained as a single authoritative anomaly detection model for a data stream.

As indicated at 810, a data record of a stream of data records may be received. A determination may be made as to whether an anomaly detection model for the data stream should be updated with the data record, as indicated at 820.

For example, some anomaly detection models may be generated based on every data record in a stream, accruing new data records in the anomaly detection model as they are received. In some embodiments, anomaly detection models may rely upon sampling other techniques to select a portion of data records within a time period to generate the anomaly detection model. Thus, a random number generator, hash value, or other randomizing technique may be applied to determine whether or not the data record is to be included in the anomaly detection model. In some embodiments, the impact or change made upon the anomaly detection model by including the data record may be estimated or determined. In such cases, if the data record indicates a change above some inclusion threshold, then the data record may be added to the anomaly detection model. If, as indicated by the positive exit from 820 the data record is to be added to the anomaly detection model, then as indicated at 830, a version of the anomaly detection model that includes the data record is generated.

In some embodiments, a determination may also be made as to whether data record(s) should be removed from the anomaly detection model, as indicated at 840. For instance, if the anomaly detection model acts as a rolling window on the stream of data records, then old data records may be removed as new data records are added in order to ensure that the model maintains a same or similar size. In some embodiments, data records may be randomly selected for removal (similar to randomized decisions to include data record). The expiration of a time threshold, or other staleness indicator, may be implemented to indicate those data record(s) to be removed, in some embodiments. If data records are identified for removal, then as indicated at 850, a version of the anomaly detection model that excludes the data record(s) may be generated.

In some embodiments, anomaly detection models do not retain individual data records but portions or particular attribute values, either individual or included as part of calculated value or group of values. For instance, an attribute value may be incorporated into a rolling average or distribution without retaining the entire data record. Thus, in some embodiments, updating the anomaly detection model dynamically may include biasing out portions of the data (instead of removing data records) to reduce the influence of stale data records outside of the time period (e.g., by applying a time decay or attenuation function to the portions of data). In some embodiments, data may be indexed according to time so that older data may be removed as new data is incorporated into the anomaly detection model. Thus, the previous examples are not intended to be limiting but merely provided as examples of the various ways in which the anomaly detection may be updated for different time periods.

The techniques described above may be useful in a number of scenarios. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate billing records, to determine effective provisioning plans for the data centers of the provider network, to detect network attacks, and the like. The monitoring records may form an input stream to an SMS for scalable ingestion and storage, and the real time anomaly detection techniques described may be implemented for the analysis of the collected metrics. Similarly, applications to collect and analyze large numbers of log records from numerous log sources (e.g., application logs from the nodes of a distributed application, or system logs from the hosts or compute instances at a data center) may also be able to utilize SMS and idempotent processing functionality. In at least some environments, the processing operations for data records may comprise a real-time ETL (Extract-Transform-Load) processing operation (i.e., an operation that transforms received data records in real time for loading into a destination, instead of doing the transformation offline), or a transformation of data records for insertion into a data warehouse. Using a data stream for loading data into a data warehouse in real time may avoid the delays that are typically required to clean and curate data from one or more data sources, before the data can be inserted into a warehouse for analysis.

A number of different "big data" applications may also be built using the SMS and processing techniques. For example, the analysis of trends in various forms of social media interactions may be performed efficiently using streams. Data collected from mobile phones or tablet computers, such as location information of the users, may be managed as stream records. Audio or video information, collected for example from a fleet of monitoring cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of real time anomaly detection in data streams as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more compute nodes, each comprising at least one processor and a memory, that implement a data stream analytics platform configured to:
receive a request from a client to monitor a stream of data records for one or more anomalies, the request comprising an anomaly definition and one or more detection attributes;
monitor the stream of data records for a measurable difference that exceeds a threshold as the data records of the stream are received at the one or more computing devices, the measurable difference determined based at least in part on the one or more detection attributes, the threshold determined from the anomaly definition, wherein to monitor the stream of data records the data stream analytics platform is configured to:
evaluate a data record in the stream of data records according to the one or more detection attributes; and
detect an anomaly in the stream of data records based on the evaluation of the data record; and
perform an action responsive to detecting the anomaly.

2. The system of claim 1, wherein the data stream analytics platform is configured to receive, prior to performing the responsive action, a request from a client of the data stream analytics platform via programmatic interface for the data stream analytics platform selecting the responsive action for performance.

3. The system of claim 1, wherein an indication of the anomaly is sent to a data store to be persisted as part of a log that logs anomalies detected for the stream of data records.

4. The system of claim 1, wherein the data stream analytics platform is implemented as part of network-based stream management service and wherein the stream of data records are received from a client of the network-based stream management service, wherein individual ones of the data records in the stream include a respective timestamp.

5. A method, comprising:
performing, by one or more computing devices:
receiving a request from a client to monitor a stream of data records for one or more anomalies, the request comprising a detection model further comprising an anomaly definition and one or more detection attributes;
monitoring the stream of data records for a measurable difference that exceeds a threshold as the data records of the stream are received at the one or more computing devices, the measurable difference determined based at least in part on the one or more detection attributes, the threshold determined from the anomaly definition, and the monitoring comprising:
evaluating a data record in the stream of data records according to the one or more detection attributes; and
based on the evaluation of the data record, detecting an anomaly in the stream of data records; and
performing an action responsive to detecting the anomaly.

6. The method of claim 5, wherein monitoring the stream of data records further comprises adding to or removing from the detection model based on another data record.

7. The method of claim 5, wherein evaluating the data record in the stream of data records according to the one or more detection attributes comprises:
determining a distance measure for the data record with respect to one or more other data records; and
comparing the distance measure to the threshold to determine that the distance measure exceeds the threshold.

8. The method of claim 7, wherein the distance measure is a rate of change for attribute values and wherein the threshold is a rate change threshold.

9. The method of claim 5, wherein the request is received via a graphical user interface (GUI).

10. The method of claim 5, further comprising:
prior to performing the responsive action, receiving a request from a client selecting the responsive action for performance.

11. The method of claim 5, wherein performing the responsive action comprises inserting additional data into the data record identifying the data record as anomalous.

12. The method of claim 5, wherein performing the responsive action comprises filtering the data record from the stream of data records.

13. The method of claim 5, wherein performing the responsive action comprises initiating an analysis of one or more other data sets associated with the data record.

14. One or more non-transitory, computer-readable storage media storing program instructions that when executed on or across one or more computing devices cause the one or more computing devices to implement:
receiving a request from a client to monitor a stream of data records for one or more anomalies, the request comprising a detection model further comprising an anomaly definition and one or more detection attributes;
monitoring the stream of data records for measurable difference that exceeds a threshold as the data records of the stream are received at the one or more computing devices, the measurable difference determined based at least in part on the one or more detection attributes, the threshold determined from the anomaly definition, and the monitoring comprising:
evaluating a data record in the stream of data records according to the one or more detection attributes; and
based on the evaluation of the data record, detecting an anomaly in the stream of data records; and
in response to identifying the anomaly, performing a responsive action.

15. The one or more non-transitory, computer-readable storage media of claim 14, wherein, in monitoring the stream of data records further, the program instructions cause the one or more computing devices to further implement adding to or removing from the detection model based on another data record.

16. The one or more non-transitory, computer-readable storage media of claim 14, wherein the evaluation of the data record according to the one or more detection attributes detects a change in the distribution of attribute values of data records in the time period including the data record.

17. The one or more non-transitory, computer-readable storage media of claim 14, wherein evaluating the data record in the stream of data records according to the one or more detection attributes comprises:
   determining a distance measure for the data record with respect to one or more other data; and
   comparing the distance measure to the threshold to determine that the distance measure exceeds the threshold.

18. The one or more non-transitory, computer-readable storage media of claim 14, wherein the program instructions cause the one or more computing devices to further implement receiving a request from a client that identifies the responsive action for performance in response to detecting the anomaly.

19. The one or more non-transitory, computer-readable storage media of claim 18, wherein the request is received via a graphical user interface (GUI).

20. The one or more non-transitory, computer-readable storage media of claim 14, wherein the one or more computing devices implement an anomaly detection node that is implemented as part of network-based stream management service and wherein the stream of data records are received from a client of the network-based stream management service.

* * * * *